US009522478B2

(12) United States Patent
Mochizuki et al.

(10) Patent No.: US 9,522,478 B2
(45) Date of Patent: Dec. 20, 2016

(54) ROTARY DIE CUTTER

(71) Applicant: Horizon International Inc., Shiga (JP)

(72) Inventors: Jun Mochizuki, Shiga (JP); Toyoki Takeuchi, Shiga (JP); Yoshiyuki Horii, Shiga (JP); Hidekazu Ozasa, Shiga (JP)

(73) Assignee: Horizon International Inc., Shiga (JP)

( * ) Notice: Subject to any disclaimer, the term of this patent is extended or adjusted under 35 U.S.C. 154(b) by 0 days.

(21) Appl. No.: 14/259,203

(22) Filed: Apr. 23, 2014

(65) Prior Publication Data

US 2014/0318340 A1 Oct. 30, 2014

(30) Foreign Application Priority Data

Apr. 26, 2013 (JP) ................................ 2013-093711
Mar. 24, 2014 (JP) ................................ 2014-059951

(51) Int. Cl.

| | |
|---|---|
| ***B23D 25/06*** | (2006.01) |
| ***B26F 1/38*** | (2006.01) |
| ***B26D 5/32*** | (2006.01) |
| ***B65H 5/06*** | (2006.01) |
| ***B65H 7/20*** | (2006.01) |
| ***B65H 11/00*** | (2006.01) |
| *B26D 7/26* | (2006.01) |

(52) U.S. Cl.

CPC ................ *B26F 1/384* (2013.01); *B26D 5/32* (2013.01); *B65H 5/062* (2013.01); *B65H 7/20* (2013.01); *B65H 11/005* (2013.01); *B26D 2007/2607* (2013.01); *B65H 2301/4493* (2013.01); *B65H 2513/40* (2013.01); *Y10T 83/4838* (2015.04)

(58) Field of Classification Search

CPC ............. B26F 1/384; B26D 5/32; B26D 5/62; B26D 2007/2607; B65H 7/20; B65H 11/005; B65H 2301/4495; B65H 2301/4493; B65H 2513/40; Y10T 83/4838
USPC ................................. 83/284–349, 76.6–76.9
See application file for complete search history.

(56) References Cited

U.S. PATENT DOCUMENTS

| | | | | | |
|---|---|---|---|---|---|
| 5,421,227 | A * | 6/1995 | Rohrdanz et al. | ................ | 83/38 |
| 5,765,460 | A * | 6/1998 | Wathieu | ............................ | 83/37 |
| 5,797,305 | A * | 8/1998 | Harrod et al. | .................... | 83/37 |
| 6,173,633 | B1 * | 1/2001 | McLaughlin | ..................... | 83/37 |
| 8,176,821 | B2 * | 5/2012 | Taillardat | ....................... | 83/331 |
| 2005/0061171 | A1 | 3/2005 | Angelo | | |

FOREIGN PATENT DOCUMENTS

| | | |
|---|---|---|
| DE | 1121916 | 1/1962 |
| DE | 202012100708 | 4/2012 |
| JP | 11077597 | 3/1999 |
| JP | 2003-237018 | 8/2003 |
| JP | 2003305694 | 10/2003 |
| JP | 2007118121 | 5/2007 |
| JP | 2012-161859 | 8/2012 |

* cited by examiner

*Primary Examiner* — Omar Flores Sanchez
(74) *Attorney, Agent, or Firm* — Kirschstein, Israel, Schiffmiller & Pieroni, P.C.

(57) ABSTRACT

A sheet is intermittently advanced or alternately advanced and retreated by a pair of feed rollers in synchronization with rotation of a pair of magnet and anvil rollers so that the pair of magnet and anvil rollers makes two or more revolutions while the sheet passes through the pair of magnet and anvil rollers. The punching of the same pattern is performed by a flexible die at a plurality of areas of the sheet spaced in a sheet conveying direction.

3 Claims, 8 Drawing Sheets

ROTARY DIE CUTTER

TECHNICAL FIELD

The present invention relates to a rotary die cutter comprises a pair of a magnet roller on which a flexible die is mounted, and an anvil roller arranged opposite to the magnet roller and punches out a sheet is supplied one by one between the magnet roller and the anvil roller.

BACKGROUND ART

A conventional rotary die cutter comprises a magnet roller, an anvil roller arranged opposite to the magnet roller, a single flexible die mounted on the magnet roller and a sheet feed unit supplying a sheet one by one between the magnet and anvil rollers, in which the sheet supplied from the sheet feed unit is punched out by the flexible die (the term "punch" may be used to denote not only its original meanings but also "emboss", "score", "perforate" and so on. The same applies hereinafter.) while the sheet is conveyed by the magnet and anvil rollers (See, for example, JP 2003-237018 A and JP 2012-161859 A).

In such rotary die cutter, the punching of one sheet is completed each time the magnet and anvil rollers make one revolution because the punching is done with the conveyance of the sheet by the magnet and anvil rollers. Therefore, commonly, in order to maximize a production volume per revolution of the magnet and anvil rollers, that is, a. production volume per hour, the largest possible size of the flexible die (the flexible die extending over the whole circumference of the magnet roller) is used. This configuration is quite effective in mass production of the same type of product.

On the other hand, this conventional rotary die cutter has the disadvantages that a sheet needs to have a certain size adapted for the flexible die and the use of a small size of the flexible die causes reduction of a production volume per revolution of the magnet and anvil rollers. Consequently, even when a small amount of small-sized products which are considerably smaller than a processable size of sheet are produced, it is necessary to form a number of the same punching patterns on a large-sized flexible die and punch a certain size of sheet by use of the large-sized flexible die, which raises production costs.

SUMMARY OF THE INVENTION

Problems to be Solved by the Invention

It is, therefore, an object of the present invention to provide a rotary die cutter enable manufacturing of a wide variety of products in small quantities at low cost.

Means for Solving the Problems

In order to achieve this object, according to the present invention, there is provided a rotary die cutter comprising: a magnet roller; an anvil roller arranged in parallel with and opposite to the magnet roller with a gap therebetween; a single sheet-like flexible die mounted on the magnet roller; a pair of feed rollers spaced from the pair of magnet and anvil rollers; a first drive mechanism rotating the magnet and anvil rollers in such a way that the magnet and anvil rollers are constantly rotated synchronously with each other at an equal circumferential velocity, a second drive mechanism rotating the pair of feed rollers; a controller controlling the first and second drive mechanisms, the magnet and anvil rollers being rotated in a direction to receive a sheet from the pair of feed rollers; and a sensor arranged between the pair of magnet and anvil rollers and the pair of feed rollers to detect the passage of a leading end of the sheet, wherein every time a detection signal is outputted from the sensor, the pair of feed rollers is intermittently rotated in a direction to convey the sheet to the pair of magnet and anvil rollers, or alternately rotated in the direction to convey the sheet to the pair of the magnet and anvil rollers and the reverse direction at a predetermined timing corresponding to a peripheral velocity and a rotational position of the flexible die so that a plurality of areas spaced from each other in the conveying direction on the sheet are punched by the flexible die while the sheet is conveyed between the magnet and anvil rollers by the pair of feed rollers. Here, the term "punch" may be used to denote not only its original meanings but also "emboss", "score", "perforate" and so on. The same applies hereinafter.

According to a preferred embodiment of the present invention, the controller comprises an input unit for receiving input of the data about the punching of the sheet including a size of the sheet, a distance from the leading end of the sheet to a leading end of a punching range on the sheet, and a position of a start point of punching on the sheet at each punching operation of the flexible die, and the timing of rotation of the pair of feed rollers is determined by the controller based on the data about the punching of the sheet, the rotational velocity of the pair of feed rollers, and the peripheral velocity and the rotational position of the flexible die.

According to another preferred embodiment of the present invention, the rotary die cutter further comprises: a sheet supply unit supplying sheets one by one from a sheet stack; and a suction conveyor belt extending between the sheet supply unit and the pair of feed rollers so as to convey the sheet from the sheet supply unit to the pair of feed rollers while the sheet is sucked by the suction conveyor belt at the underside thereof, wherein the sheet supply unit and the suction conveyor belt is controlled by the controller so that the suction conveyor belt constantly operates while the sheet supply unit supplies the next sheet every time the punching of the previous sheet is completed.

Effect of the Invention

According to the present invention, the first drive mechanism rotating the magnet and anvil rollers and the second drive mechanism rotating the pair of feed rollers are arranged independently of each other so that the pair of magnet and anvil rollers does not contribute to conveying the sheet substantially but exclusively performs the punching operation of the sheet on the one hand and the pair of feed rollers conveys the sheet on the other hand, and thereby the punching of the sheet is performed while the sheet is conveyed by the pair of feed rollers between the magnet and anvil rollers. Consequently, the punching can be accurately done at the predetermined positions on the sheet independently of a size of the flexible die.

Furthermore, the pair of feed rollers is intermittently rotated in the direction to convey the sheet to the pair of magnet and anvil rollers, or alternately rotated in the direction to convey the sheet to the pair of magnet and anvil rollers and the reverse direction at the predetermined timing so that the sheet is intermittently moved forward, or repeatedly moved forward and backward with respect to the pair of magnet and anvil rollers, and thereby the pair of magnet and anvil rollers can make two or more revolutions while the sheet passes through the pair of magnet and anvil rollers. Consequently, a length of the flexible die along a circumference of the magnet roller can be limited to the bare minimum, so that the cost of manufacturing the flexible die is considerably reduced when compared to the above-mentioned conventional rotary die cutter. Therefore, it is possible to achieve the manufacturing of a wide variety of products in small quantities at low cost.

BEST MODE FOR CARRYING OUT THE INVENTION

Figure 1:
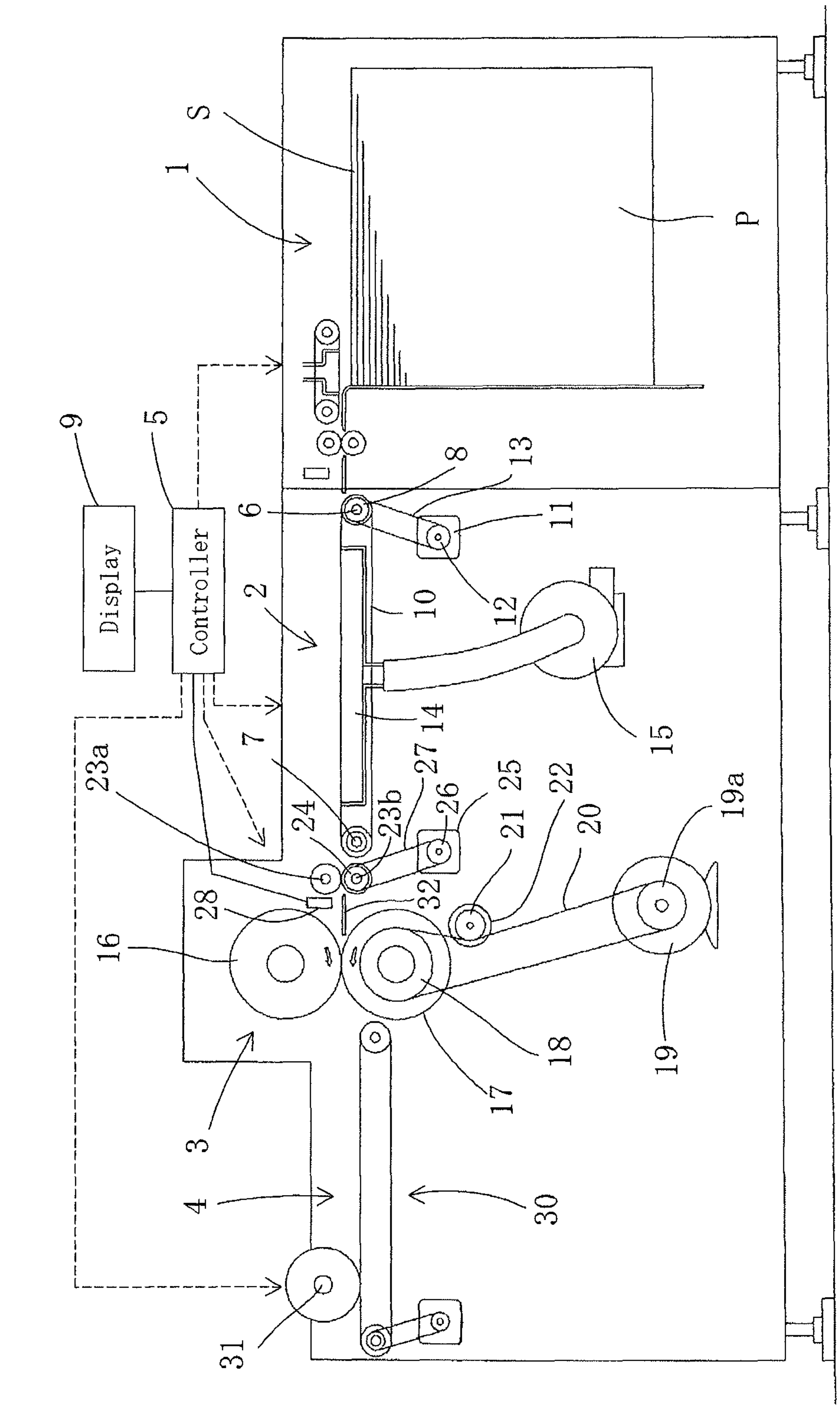
FIG. 1 is a side view schematically showing a configuration of a rotary die cutter according to an embodiment of the present invention.
Figure 2A:
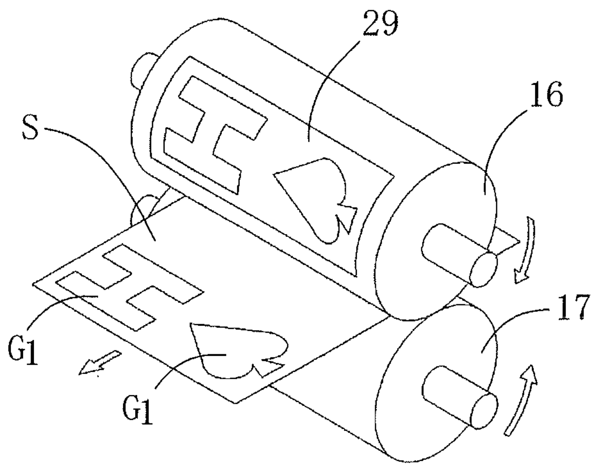
FIG. 2A through 2C are perspective views illustrating an operation of the rotary die cutter shown in FIG. 1, respectively.
Figure 2B:
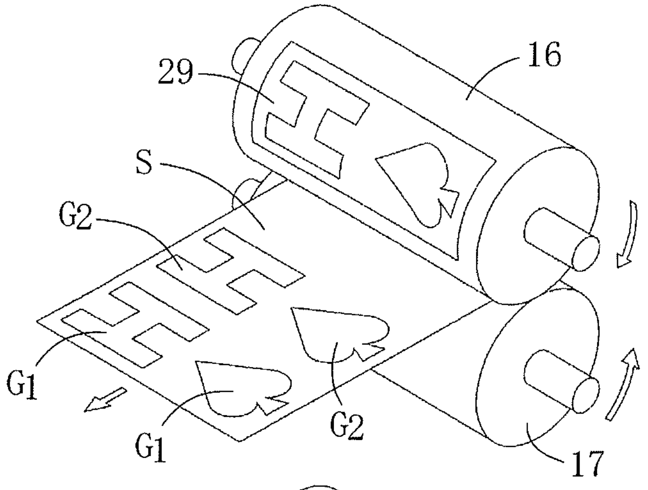
Figure 2C:
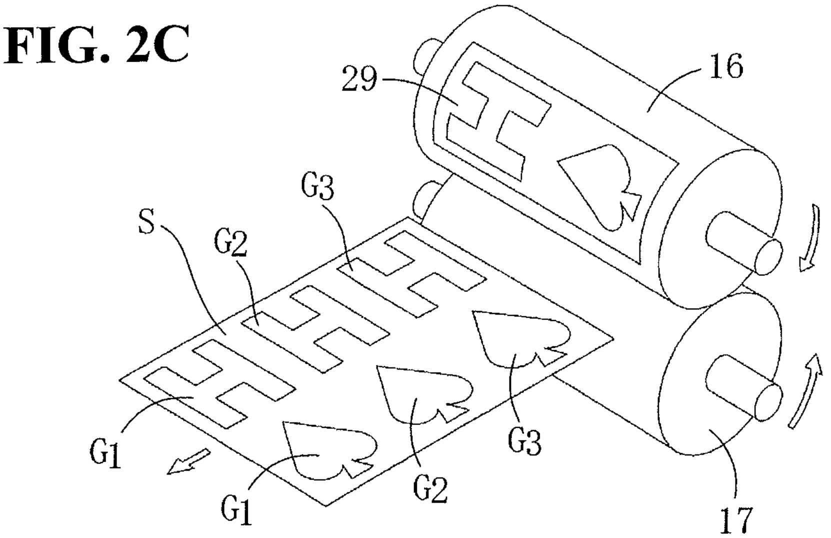

A preferred embodiment of the present invention will be described below with reference to accompanying drawings. FIG. 1 is a side view schematically showing a configuration of a rotary die cutter according to an embodiment of the present invention, and FIG. 2A through 2C are perspective views illustrating an operation of the rotary die cutter shown in FIG. 1, respectively. Referring to FIG. 1, a rotary die cutter according to the present invention comprises a sheet supply unit 1 supplying sheets S one by one from a sheet stack P, a suction conveyor belt 2 arranged downstream of the sheet supply unit 1 to convey the sheet S received from the sheet supply unit 1, a punching unit 3 arranged downstream of the suction conveyor belt 2, an ejecting unit 4 arranged downstream of the punching unit 3 to eject the punched sheet S, and a controller 5 controlling operations of the sheet supply unit 1, the suction conveyor belt 2, the punching unit 3 and the ejecting unit 4.

The suction conveyor belt 2 comprises a pair of horizontal roller 6, 7 arranged adjacent to the sheet supply unit 1 and the punching unit 3 and extending across and perpendicular to a sheet conveying path, and an endless belt 10 extending between the pair of rollers 6, 7. Vents are uniformly formed on the endless belt 10. One roller 6 of the pair of rollers 6, 7 is provided with a first pulley 8 at a shaft thereof and a motor 11 is arranged below the roller 6. A drive shaft of the motor 11 extends parallel to the roller 6 and is provided with a second pulley 12. An another endless belt 13 extends between the first and second pulleys 8, 12. Thus the endless belt 10 is circulated by the motor 11.

Furthermore, a suction duct 14 is arranged below an upper straight portion of the endless belt 10 between the pair of rollers 6, 7. The suction duct 14 is provided with intake vents at its upper surface and connected to a vacuum pump 15. Thus the endless belt 10 circulates and the vacuum pump operates so that the sheet S supplied from the sheet supply unit 1 is conveyed to the punching unit 3 while the sheet S is sucked by the suction conveyor belt 10 at the underside thereof. The motor 11 and the vacuum pump 15 are controlled by the controller 5

The punching unit 3 comprises a magnet roller 16 arranged parallel to the pair of rollers 6, 7, and an anvil roller 17 arranged in parallel with and opposite to the magnet roller 16 with a gap therebetween. As shown in FIG. 2, a single sheet-like flexible die 29 is mounted on the magnet roller 6 by means of the magnet force of the magnet roller 6.

Referring to FIG. 1 again, the anvil roller 17 is provided with a third pulley 18 at a shaft thereof and a motor 19 is arranged below the anvil roller 17. A drive shaft of the motor 19 is provided with a fourth pulley 19*a* and extends parallel to the anvil roller 17. A first timing belt 20 extends between the third and fourth pulleys 18, 19*a*. The anvil roller 17 is rotated by the motor 19. The motor 19 is controlled by the controller 5. A shaft of the magnet roller 16 is coupled to the shaft of the anvil roller 17 through a connecting mechanism (not shown) in such a way that the magnet and anvil rollers 16, 17 are rotated synchronously with each other at an equal circumferential velocity in a direction to receive a sheet S from the suction conveyor belt 2.

The motor 19, the third and fourth pulleys 18, 19*a*, the first timing belt 20 and the connecting mechanism (not shown) construct a first drive mechanism rotating the magnet and anvil rollers 16, 17.

A rotary encoder 22 is arranged between the anvil roller 17 and the motor 19. A rotary shaft of the rotary encoder 22 is provided with a fifth pulley 21 and extends parallel with the shaft of the anvil roller 17. The fifth pulley 21 contacts with the first timing belt 20 so as to be rotated by the circulation of the first timing belt 20. The control unit 5 detects a rotational position of the anvil roller 17, that is, the magnet roller 16 (that is, the flexible die 29) based on pulses outputted from the rotary encoder 22.

The punching unit 3 further comprises a pair of feed rollers 23*a*, 23*b* spaced upstream of the pair of magnet and anvil rollers 16, 17 and arranged adjacent to the downstream of the suction conveyor belt 2. The pair of feed rollers 23*a*, 23*b* consists of a pair of rollers which are arranged opposite to each other in a vertical direction and extend parallel to the magnet and anvil rollers 16, 17.

A lower roller 23*b* of the pair of feed rollers 23*a*, 23*b* is provided with a sixth pulley 24 at a shaft thereof. A servo motor 25 is arranged below the lower roller 23*b*, and a drive shaft of the servo motor 25 is provided with a seventh pulley 26 and extends parallel to the lower roller 23*b*. A second timing belt 27 extends between the sixth and seventh pulleys 24, 26 so that the pair of feed rollers 23*a*, 23*b* are rotated in clockwise and anticlockwise directions by the servo motor 25. The servo motor 25 is controlled by the control unit 5. The servo motor 25, the sixth and seventh pulleys 24, 26 and the second timing belt 27 construct a second drive mechanism rotating the pair of feed rollers 23*a*, 23*b*.

A sensor 28 is arranged downstream of the pair of feed rollers 23*a*, 23*b* so as to detect the passage of a leading end of the sheet S. Detection signals are sent to the controller 5. A flat support plate 32 is arranged between the pair of feed rollers 23*a*, 23*b* and the pair of magnet and anvil rollers 16, 17 so as to support the underside of the sheet conveyed by the pair of feed rollers 23*a*, 23*b*. The support plate 32 is provided if needed.

The controller 5 comprises an input unit for receiving input of the data about the punching of the sheet, for example, a size of the sheet S, a distance from the leading end of the sheet S to a leading end of a punching range on the sheet S, and a position of a start point of punching on the sheet S at each punching operation of the flexible die 28. In this embodiment, the input unit is composed of a touch panel display 9 and a numerical key pad (not shown).

Figure 7:
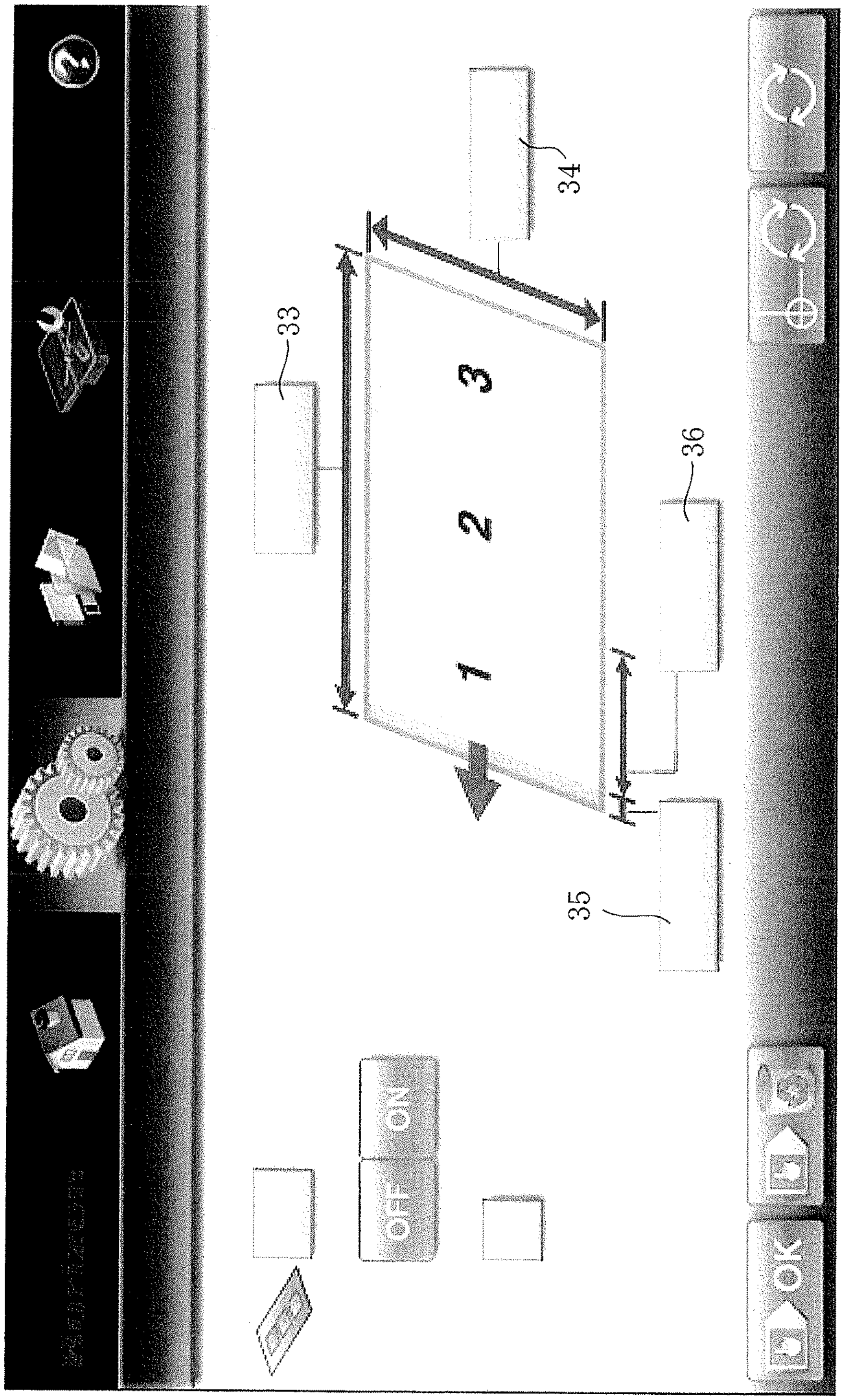
FIG. 7 is a plan view showing an example of a data input screen displayed on a touch panel display of a controller of the rotary die cutter shown in FIG. 1.

FIG. 7 is a plan view showing an example of a data input screen displayed on the touch panel display 9. The data input screen shown in FIG. 7 corresponds to a situation in which the punching operation of the flexible die is performed three times for a single sheet so as to punch three areas spaced in a conveying direction of the sheet in the same pattern. Referring to FIG. 7, a picture of a sheet is displayed in the center of the data input screen and data input columns 33-36 are provided to input the required data easily with the help of the picture. A size of the sheet in a lengthwise direction (the conveying direction of the sheet) is inputted in the data input column 33 and a size of the sheet in a crosswise direction (a direction perpendicular to the conveying direction) is inputted in the data input column 34. A distance from a leading end of the sheet to a leading end of a whole punching range on the sheet is inputted in the data input column 35 and a distance between the leading end of a first punching range on the sheet and the leading end of a second punching range on the sheet is inputted in the data input area 36 (in this embodiment, the punching operation is repeated at even intervals and therefore, only input of the distance between the leading end of the first punching range on the sheet and the leading end of the second punching range on the sheet is enough). The necessary numerical data is inputted in those data input columns 33-36 through the numerical key pad.

In this case, if the distance from the reading end of the sheet to the leading end of the whole punching range on the sheet and the distances between the leading ends of the adjacent punching ranges on the sheet can be inputted separately, for example, when a sheet is punched according to a pattern printed thereon, even though a shrink of the sheet due to printing causes misalignment of shapes of the printed pattern, correspondingly, it is possible to easily correct the position of punching.

Thus the sheet S supplied by the sheet supply unit 1 is conveyed by the suction conveyor belt 2 and fed in a gap between the pair of feed rollers 23*a*, 23*b*. In this case, the suction conveyor belt 2 constantly operates while the sheet supply unit 1 supplies the next sheet S every time the punching of the previous sheet S is completed. The operation of the suction conveyor belt 2 does not block the conveyance of the sheet S by the rotation of the pair of feed rollers 23*a*, 23*b* in the clockwise and anticlockwise directions.

The sheet S fed in the gap between the pair of feed rollers 23*a*, 23*b* is conveyed to a gap between the magnet and anvil rollers 16, 17 by the pair of feed rollers 23*a*, 23*b* while being guided by the support plate 32. Then, every time a detection signal is outputted from the sensor 28, the pair of feed rollers 23*a*, 23*b* is intermittently rotated in a direction to convey the sheet S to the pair of magnet and anvil rollers 16, 17, or alternately rotated in the direction to convey the sheet S to the pair of the magnet and anvil rollers 16, 17 and the reverse direction at a predetermined timing corresponding to a peripheral velocity and a rotational position of the flexible die 29 (the rotation of the pair of feed rollers 23*a*, 23*b* in the direction to convey the sheet to the pair of magnet and anvil rollers 16, 16 will be referred as "forward rotation" and the rotation of the pair of feed rollers 23*a*, 23*b* in the reverse direction will be referred as "reverse rotation" hereinafter). The timing of rotation of the pair of feed rollers 23*a*, 23*b* is determined by the controller 5 based on the data about the punching of the sheet S, the data being inputted through the input unit, the rotational velocity of the pair of feed rollers 23*a*, 23*b*, and the peripheral velocity and the rotational position of the flexible die 29.

Thus the sheet S is intermittently advanced toward, or alternately advanced toward and retreated from the pair of magnet and anvil rollers 16, 17 so that, as shown in FIG. 2, a plurality of areas G1-G3 spaced from each other in the conveying direction on the sheet S are punched by the flexible die 29. In this case, it should be noted that the pair of magnet and anvil rollers 16, 17 does not contribute to conveying the sheet S substantially but exclusively performs the punching operation of the sheet except when the flexible die cuts into the sheet S on the one hand and the pair of feed rollers conveys the sheet on the other hand.

The ejecting unit 4 comprises a conveyor belt 30 extending from an exit of the pair of magnet and anvil rollers 16, 17 to an exit of the rotary die cutter, a feed roller 31 arranged adjacent to the downstream of the conveyor belt 30. The feed roller 31 extends perpendicularly to the conveyor belt 30 and contacts the upper surface of the conveyor belt 30. The sheet S punched by the punching unit 3 is conveyed by the conveyor belt 30 and the feed roller 31 and discharged from the exit of the rotary die cutter.

Next, an operation of the punching unit 3 of the rotary die cutter according to the present invention will be explained in detail. As shown in FIG. 2, the explanation is based on the assumption that the sheet S is punched by the flexible die 29 at three areas thereof spaced in the conveying direction. First, an operation of the punching unit 3 when the rotary die cutter of the present invention operates in one operation mode will be explained. In this operation mode, the punching is performed while the sheet S is alternately advanced toward and retreated from the pair of magnet and anvil rollers 16, 17.

Figure 3:
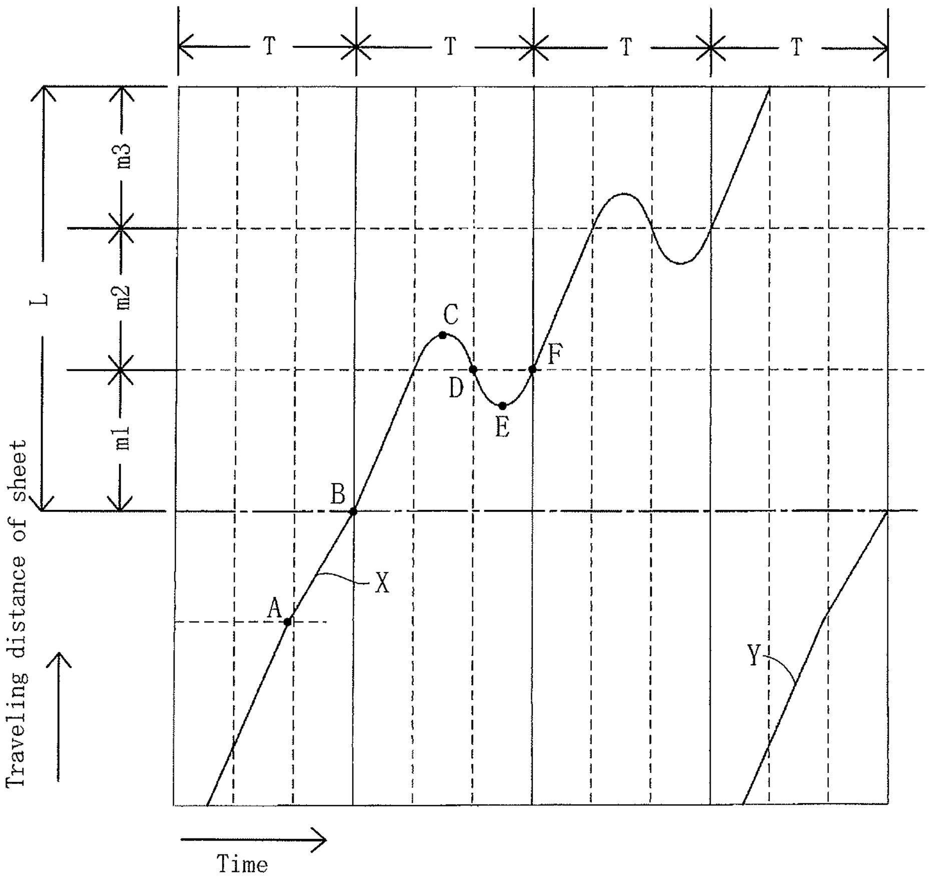
FIG. 3 is a graph illustrating one operation mode of the rotary die cutter shown in FIG. 1.

FIG. 3 is a graph indicating a change in a travelling distance of the leading end of the sheet S measured from the pair of feed rollers 23*a*, 23*b* against time after the sheet S is fed in the gap between the pair of feed rollers 23*a*, 23*b* in this operation mode. In FIG. 3, a curve X represents a sheet S and a curve Y represents the next sheet S. A vertical axis of the graph represents the travelling distance of the sheet S and a horizontal axis of the graph represents time. An alphabet L represents a length of the whole punching range on the sheet S, each alphabet m1-m3 represents a length of each of first through third punching ranges, and an alphabet T represents a time required for the magnet roller 16 to make one revolution (rotation period). FIG. 4A through 4F are side views showing a positional relation of the pair of magnet and anvil rollers 16, 17 and the sheet S at points A through F on the graph shown in FIG. 3, respectively.

Figure 4A:
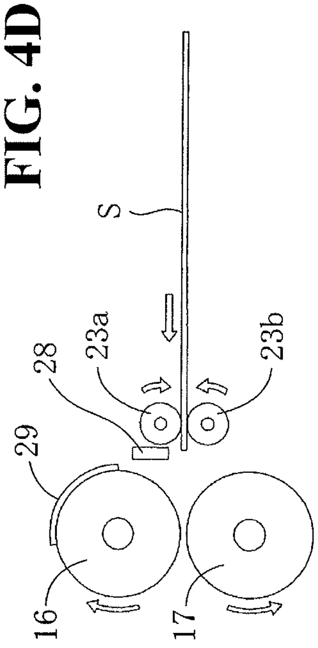
FIG. 4A through 4F are side views showing a positional relation of a pair of magnet and anvil rollers and a sheet at points A through F on the graph shown in FIG. 3, respectively.
Figure 4B:
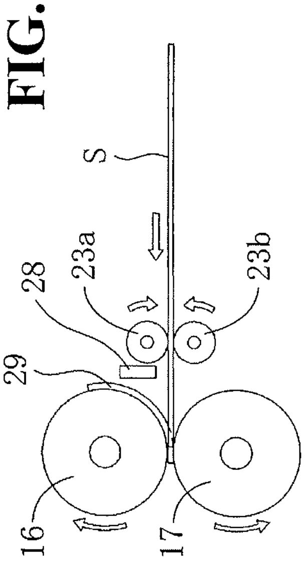

Referring to FIGS. 3 and 4, when the sensor 28 detects the leading end of the sheet S conveyed by the pair of feed rollers 23*a*, 23*b* rotating forward (See, the point A in FIG. 3 and FIG. 4A), the sheet S is advanced toward the pair of magnet and anvil rollers 16, 17 while the rotational velocity of the pair of feed rollers 23*a*, 23*b* is controlled so that the leading end of the whole punching range L on the sheet S coincides with the leading end of the flexible die 29 at the lowest point of the periphery of the magnet roller 16 (See, the point B in FIG. 3 and FIG. 4B). Then the sheet S is further advanced (conveyed toward the downstream between the magnet and anvil rollers 16, 17) at the same speed as the peripheral velocity of the pair of magnet and anvil rollers 16, 17. In this period, a first punching operation by the flexible die 19 is performed within the first punching range m1 on the sheet S.

Figure 4C:
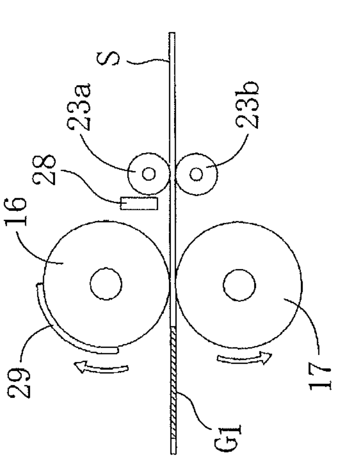

When the tail end of the flexible die 29 is separated from the sheet S, the pair of feed rollers 23*a*, 23*b* starts decelerating, and when the punched area G1 of the sheet is completely ejected from the pair of magnet and anvil rollers 16, 17, the pair of feed rollers 23*a*, 23*b* stops rotating (See, the point C in FIG. 3 and FIG. 4C). Thus the punching is performed by the flexible die 29 in the first punching range m1 on the sheet S during one revolution of the pair of magnet and anvil rollers 16, 17 (time T) (See, G1 of FIGS. 2 and 4C).

Figure 4D:
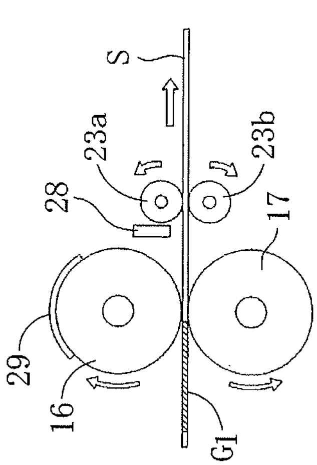
Figure 4E:
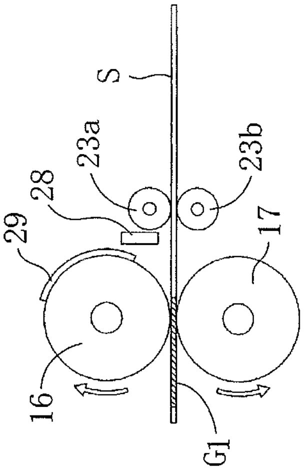
Figure 4F:
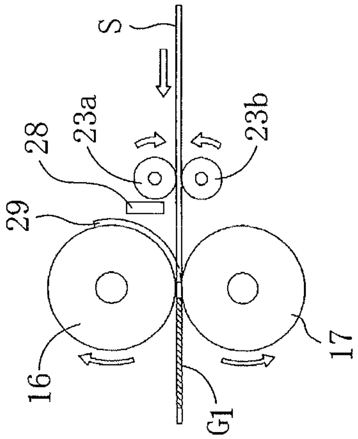

Next, the sheet S is retreated by the reverse rotation of the pair of feed rollers 23*a*, 23*b* (See, the point D in FIG. 3 and FIG. 4D). Thereafter, when the leading end of the second punching range m2 on the sheet S arrives at a point separated by a predetermined distance on the upstream side of the pair of magnet and anvil rollers 16, 17, the pair of feed rollers 23*a*, 23*b* stop rotating (See, the point E in FIG. 3 and FIG. 4E). Then the forward rotation of the pair of feed rollers 23*a*, 23*b* is started again, and the sheet S is advanced toward the pair of magnet and anvil rollers 16, 17 while the rotational velocity of the pair of feed rollers 23*a*, 23*b* is controlled so that the leading end of the second punching range m2 on the sheet S coincides with the leading end of the flexible die 29 at the lowest point of the periphery of the magnet roller 16 (See, the point F in FIG. 3 and FIG. 4F).

As before, the punching is performed by the flexible die 29 in the second punching range m2 on the sheet S during one revolution of the pair of magnet and anvil rollers 16, 17, and the punching is performed by the flexible die 29 in the third punching range m3 on the sheet S during further one revolution of the pair of magnet and anvil rollers 16, 17. Thus, as shown in FIG. 2, the punching of the same pattern is performed at three areas G1-G3 of the sheet S spaced in the conveying direction.

Secondly, an operation of the punching unit 3 when the rotary die cutter of the present invention operates in another operation mode will be explained. In this operation mode, the punching is performed while the sheet S is intermittently advanced toward the pair of magnet and anvil rollers 16, 17.

Figure 5:
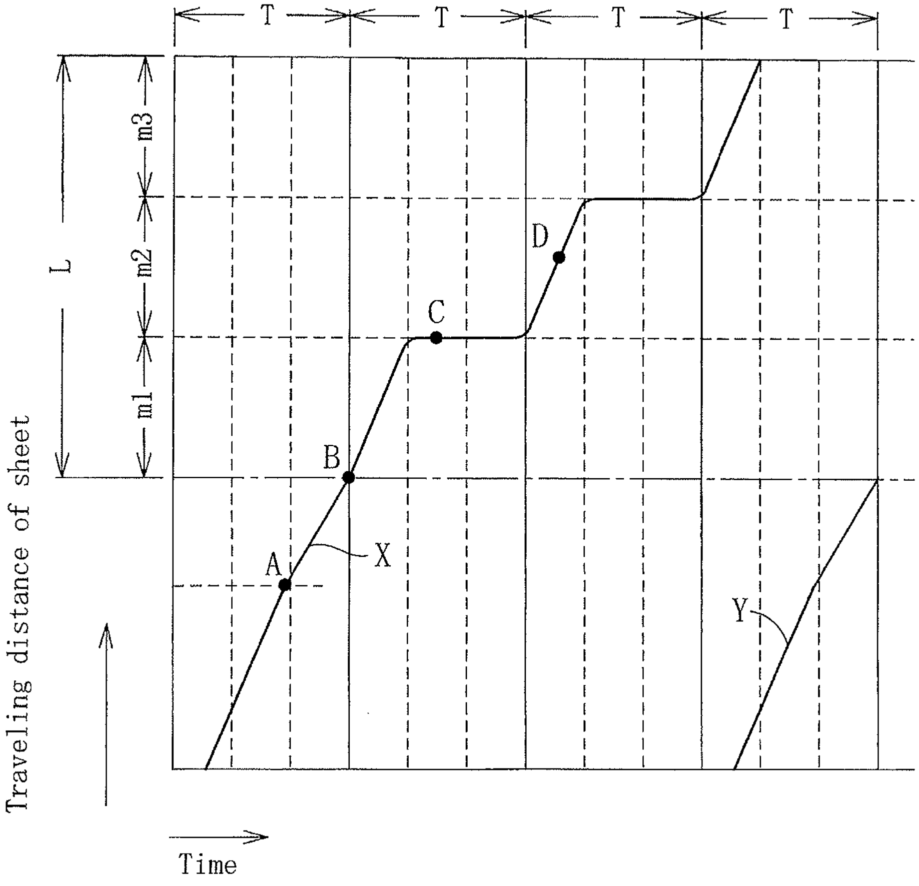
FIG. 5 is a graph illustrating another operation mode of the rotary die cutter shown in FIG. 1.

FIG. 5 is a graph indicating a change in a travelling distance of the leading end of the sheet S measured from the pair of feed rollers 23*a*, 23*b* against time after the sheet S is fed in the gap between the pair of feed rollers 23*a*, 23*b* in this operation mode. In FIG. 5, a line X represents a sheet S and a line Y represents the next sheet S. A vertical axis of the graph represents the travelling distance of the sheet S and a horizontal axis of the graph represents time. An alphabet L represents a length of the whole punching range on the sheet S, each alphabet m1-m3 represents a length of each of first through third punching ranges, and an alphabet T represents a time required for the magnet roller 16 to make one revolution (rotation period). FIG. 6A through 6D are side views showing a positional relation of the pair of magnet and anvil rollers 16, 17 and the sheet S at points A through D on the graph shown in FIG. 5, respectively.

Figure 6A:
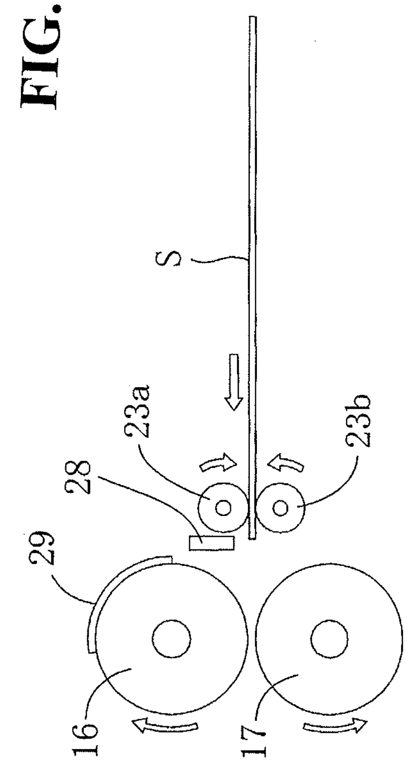
FIG. 6A through 6D are side views showing a positional relation of a pair of magnet and anvil rollers and a sheet at points A through D on the graph shown in FIG. 5, respectively.
Figure 6B:
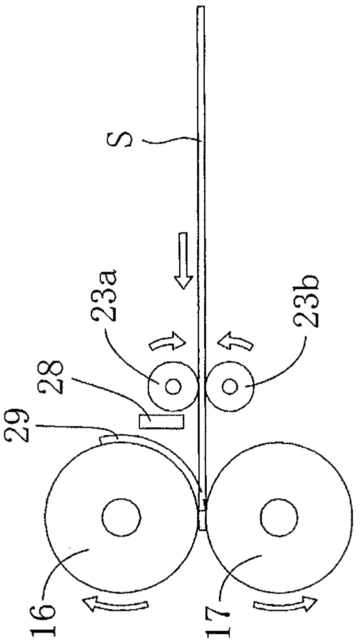
Figure 6C:
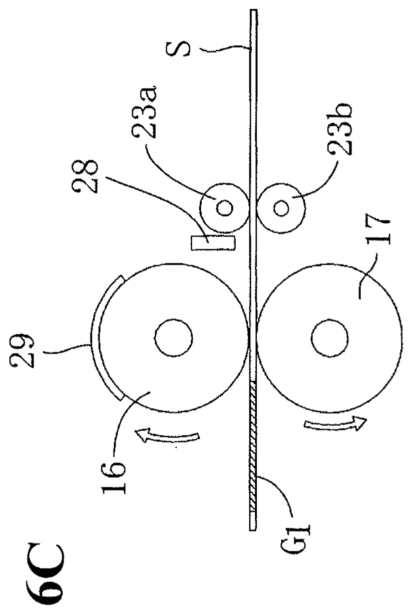
Figure 6D:
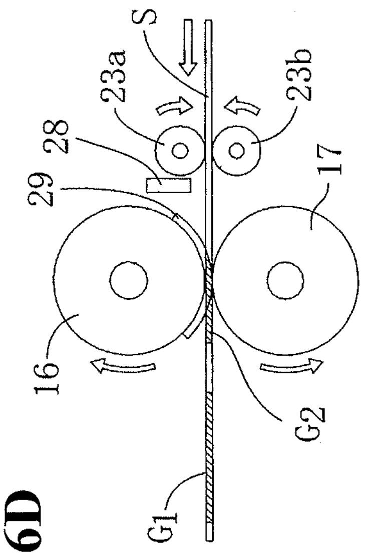

Referring to FIGS. 5 and 6, when the sensor 28 detects the leading end of the sheet S conveyed by the pair of feed rollers 23*a*, 23*b* rotating forward (See, the point A in FIG. 5 and FIG. 5A), the sheet S is advanced toward the pair of magnet and anvil rollers 16, 17 while the rotational velocity of the pair of feed rollers 23*a*, 23*b* is controlled so that the leading end of the whole punching range L on the sheet S coincides with the leading end of the flexible die 29 at the lowest point of the periphery of the magnet roller 16 (See, the point B in FIG. 5 and FIG. 6B). Then the sheet S is further advanced (conveyed toward the downstream between the magnet and anvil rollers 16, 17) at the same speed as the peripheral velocity of the pair of magnet and anvil rollers 16, 17. In this period, a first punching operation by the flexible die 29 is performed within the first punching range m1 on the sheet S.

When the punched area G1 of the sheet S is completely ejected from the pair of magnet and anvil rollers 16, 17, the pair of feed rollers 23*a*, 23*b* stops rotating and therefore, the sheet S remains stationary. On the other hand, the pair of magnet and anvil rollers 16, 17 continues to rotate while the pair of feed rollers 23*a*, 23*b* stops rotating (See, the point C in FIG. 5 and FIG. 6C). Thus the punching is performed by the flexible die 29 in the first punching range m1 on the sheet S during one revolution of the pair of magnet and anvil rollers 16, 17 (time T) (See, G1 of FIGS. 2 and 6C).

Then the pair of feed rollers 23*a*, 23*b* starts the forward rotation right before the leading end of the flexible die 29 reaches the lowest point of the periphery of the magnet roller 16 again, so that the sheet S is advanced (conveyed toward the downstream between the magnet and anvil rollers 16, 17) at the same speed as the peripheral velocity of the pair of magnet and anvil rollers 16, 17. In this period, a second punching operation by the flexible die 29 is performed within the second punching range m2 on the sheet S (See, the point D in FIG. 5 and FIG. 6D).

When the punched area G2 of the sheet S is completely ejected from the pair of magnet and anvil rollers 16, 17, the pair of feed rollers 23*a*, 23*b* stops rotating and therefore, the sheet S remains stationary. On the other hand, the pair of magnet and anvil rollers 16, 17 continues to rotate while the pair of feed rollers 23*a*, 23*b* stops rotating. Thus the punching is performed by the flexible die 29 in the second punching range m2 on the sheet S during one revolution of the pair of magnet and anvil rollers 16, 17. Further, as before, the punching is performed by the flexible die 29 in the third punching range m3 on the sheet S during one revolution of the pair of magnet and anvil rollers 16, 17. Thus, as shown in FIG. 2, the punching of the same pattern is performed at three areas G1-G3 of the sheet S spaced in the conveying direction.

In the rotary die cutter of the present invention, the first drive mechanism rotating the magnet and anvil rollers 16, 17 and the second drive mechanism rotating the pair of feed rollers 23*a*, 23*b* are arranged independently of each other so that the pair of magnet and anvil rollers 16, 17 does not contribute to conveying the sheet S substantially but exclusively performs the punching operation of the sheet S on the one hand and the pair of feed rollers 23*a*, 23*b* conveys the sheet S on the other hand, and thereby the punching of the sheet S is performed while the sheet S is conveyed by the pair of feed rollers 23*a*, 23*b* between the magnet and anvil rollers 16, 17. As a result, the punching can be accurately done at the predetermined positions on the sheet S independently of a size of the flexible die 29.

In addition, the pair of feed rollers 23*a*, 23*b* is intermittently rotated in the direction to convey the sheet S to the pair of magnet and anvil rollers 16, 17, or alternately rotated in the direction to convey the sheet S to the pair of magnet and anvil rollers 16, 17 and the reverse direction at the predetermined timing in such a way that the sheet S is intermittently moved forward, or repeatedly moved forward and backward with respect to the pair of magnet and anvil rollers 16, 17, and thereby the pair of magnet and anvil rollers 16, 17 can make two or more revolutions while the sheet S passes through the pair of magnet and anvil rollers 16, 17. Consequently, a length of the flexible die 29 along a circumference of the magnet roller 16 can be limited to the bare minimum, so that the cost of manufacturing the flexible die 29 is considerably reduced when compared to the above-mentioned conventional rotary die cutter. Therefore, it is possible to achieve the manufacturing of a wide variety of products in small quantities at low cost.

Although the present invention has been explained based on some preferred embodiment thereof, the present invention is not limited to those embodiments and one skilled in the art can easily devise various modified embodiments within the scope of the claims of the present application. For example, although a servo motor is used in the first drive mechanism rotating the pair of feed rollers 23*a*, 23*b* and a general motor is used in the second drive mechanism rotating the pair of magnet and anvil rollers 16, 17 and a rotary encoder is used for detection of rotational position of the magnet roller 16 in the above-mentioned embodiments, servo motors or stepping motors may be used in both of the first and second drive mechanisms.

Figure 8:
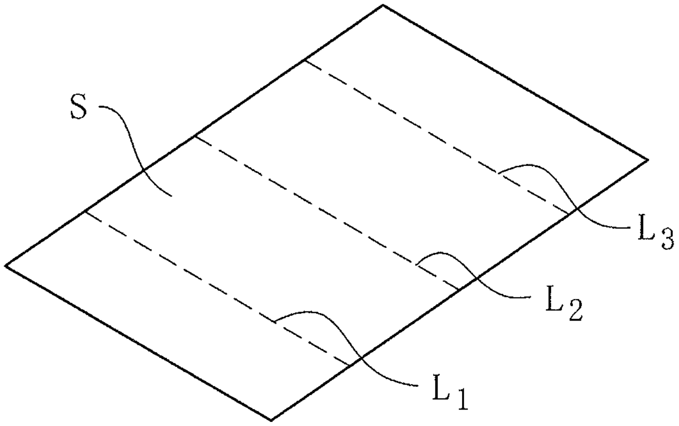
FIG. 8 is a perspective view showing another punching pattern formed by the rotary die cutter shown in FIG. 1.

Although the punching of the same pattern is performed on the sheet S at regular intervals in the conveying direction in the above-mentioned embodiments, the punching pattern of the same pattern may be performed a plurality of areas of the sheet randomly spaced in the conveying direction. Although the punching pattern is two-dimensional in the above-mentioned embodiments, as shown in FIG. 8, lines of perforation L1-L3 may be formed on a plurality of areas of the sheet S spaced in the conveying direction by using a flexible die for making perforation as the flexible die 29. Furthermore, a scoring process may be performed on the sheet S by using a flexible die for scoring as the flexible die 29.

DESCRIPTION OF REFERENCE SIGNS

1 Sheet supply unit
2 Suction conveyor belt
3 Punching unit
4 Ejecting unit
5 Controller
6, 7 Roller
8 First pulley
9 Touch panel display
10 Endless belt
11 Motor
12 Second pulley
13 Endless belt
14 Suction duct
15 Suction pump
16 Magnet roller
17 Anvil roller
18 Third pulley
19 Motor
19*a* Fourth pulley
20 First timing belt
21 Fifth pulley
22 Rotary encoder
23*a*, 23*b* A pair of feed rollers
24 Sixth pulley
25 Servo motor
26 Seventh pulley
27 Second timing belt
28 Sensor
29 Flexible die
30 Conveyor belt
31 Feed roller
32 Support plate
33-36 Data input column
P Sheet stack
S Sheet
G1-G3 Product (area to be punched on the sheet)
L1-L3 Line of perforation

The invention claimed is:

1. A rotary die cutter for punching a sheet having a length, comprising:

a magnet roller having a circumference;

an anvil roller arranged in parallel with, and opposite to, the magnet roller and hounding a gap with the magnet roller;

a flexible die mounted on the magnet roller and having a circumferential length that is shorter than the circumference of the magnet roller and the length of the sheet;

a first drive mechanism operatively connected to the magnet and anvil rollers, for constantly and synchronously rotating the magnet and anvil rollers at an equal circumferential velocity, a pair of reversible feed rollers arranged at an entrance side of the gap for moving the sheet;

a second drive mechanism operatively connected to the reversible feed rollers, for rotating the reversible feed rollers in forward circumferential directions to feed the sheet in a forward direction into the gap, and for rotating the reversible feed rollers in reverse circumferential directions to move the sheet in a reverse direction that is opposite to the forward direction;

a sensor arranged at an entrance side of the gap for detecting a leading end of the sheet during movement along the forward direction, and for generating a detection signal when the leading end is detected;

a controller operatively connected to the first and second drive mechanisms for synchronizing, in response to the generation of the detection signal, the movement of the sheet along the forward direction with at least one rotation of the magnet and anvil rollers in which the flexible die punches the sheet at one location, and the movement of the sheet along the reverse direction with at least another rotation of the magnet and anvil rollers in which the flexible die punches the sheet at another location; and a conveyor belt arranged at an exit side of the gap to receive the punched sheet.

2. The rotary die cutter according to claim 1, wherein the controller has an input unit for receiving input of data about the punching of the sheet including a size of the sheet, a distance from the leading end of the sheet to a leading end of a punching range on the sheet, and a position of a start point of punching on the sheet at each punching operation of the flexible die.

3. The rotary die cutter according to claim 1, further comprising a sheet supply unit operatively connected to the controller, for supplying the sheet from a stack of sheets, one at a time, after a previous sheet has been punched; and a suction conveyor belt operatively connected to the controller, for conveying the sheet from the sheet supply unit to the reversible feed rollers while the sheet is held by suction on the suction conveyor belt at an underside thereof.

* * * * *